(12) United States Patent
Lee

(10) Patent No.: US 12,292,902 B2
(45) Date of Patent: May 6, 2025

(54) APPARATUS AND METHOD FOR DATA CLUSTERING

(71) Applicant: CHUNG ANG University industry Academic Cooperation Foundation, Seoul (KR)

(72) Inventor: Changhee Lee, Seoul (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 0 days.

(21) Appl. No.: 18/630,084

(22) Filed: Apr. 9, 2024

(65) Prior Publication Data

US 2024/0338388 A1 Oct. 10, 2024

(30) Foreign Application Priority Data

Apr. 10, 2023 (KR) .................. 10-2023-0047068
Apr. 10, 2023 (KR) .................. 10-2023-0047069

(51) Int. Cl.
*G06F 7/00* (2006.01)
*G06F 16/22* (2019.01)
*G06F 16/2458* (2019.01)
*G06F 16/28* (2019.01)

(52) U.S. Cl.
CPC ........ *G06F 16/285* (2019.01); *G06F 16/2237* (2019.01); *G06F 16/2477* (2019.01)

(58) Field of Classification Search
CPC . G06F 16/285; G06F 16/2237; G06F 16/2477
USPC .................................................. 707/600–899
See application file for complete search history.

(56) References Cited

U.S. PATENT DOCUMENTS

2020/0342362 A1* 10/2020 Soni .................. G06N 3/044

FOREIGN PATENT DOCUMENTS

| JP | 2016103205 A | 6/2016 |
|---|---|---|
| KR | 10-2016-0015080 A | 2/2016 |
| KR | 10-2022-0094649 A | 7/2022 |
| KR | 10-2023-0013485 A | 1/2023 |

* cited by examiner

*Primary Examiner* — Isaac M Woo
(74) *Attorney, Agent, or Firm* — The PL Law Group, PLLC

(57) ABSTRACT

A method for data clustering performed in a computing device including one or more processors and a memory that stores one or more programs executed by the one or more processors according to an embodiment includes receiving two or more multivariate discrete time series data as input and generating an embedding vector for each of the multivariate discrete time series data using a first artificial neural network, generating a similarity graph by performing a path-based connectivity test between embedding vectors for each of the two or more multivariate discrete time series data, predicting a label distribution for embedding vectors for each of the two or more multivariate discrete time series data using a second artificial neural network, and clustering the two or more multivariate discrete time series data based on the similarity graph and the label distribution.

12 Claims, 4 Drawing Sheets

$$\begin{array}{c c} & \begin{array}{c c c} x^1 & x^2 & x^3 \end{array} \\ \begin{array}{c} x^1 \\ x^2 \\ x^3 \end{array} & \begin{bmatrix} 1 & 1 & 0 \\ 1 & 1 & 1 \\ 0 & 1 & 1 \end{bmatrix} \end{array}$$

APPARATUS AND METHOD FOR DATA CLUSTERING

CROSS-REFERENCE TO RELATED APPLICATION AND CLAIM OF PRIORITY

This application claims the benefit under 35 USC § 119 of Korean Patent Application Nos. 10-2023-0047068, filed on Apr. 10, 2023, and 10-2023-0047069, filed on Apr. 10, 2023, in the Korean Intellectual Property Office, the entire disclosure of which are incorporated herein by reference for all purposes.

BACKGROUND

1. Field

Embodiments of the present disclosure relates to an apparatus and method for performing data clustering of discrete time series data.

2. Description of Related Art

In a medical field, clustering of time series data is very important to understand disease progression patterns of patients and design treatment guidelines tailored to patient subgroups. However, there are difficulties in discovering predictive patterns across many potential temporal correlations in multivariate time series data and in estimating distribution of target labels that best characterizes underlying clinical progression.

SUMMARY

The disclosed embodiments are intended to provide an apparatus and method for performing data clustering of discrete time series data.

According to one aspect, there is provided a method for data clustering performed in a computing device including one or more processors and a memory that stores one or more programs executed by the one or more processors, the method including receiving two or more multivariate discrete time series data as input and generating an embedding vector for each of the multivariate discrete time series data using a first artificial neural network, generating a similarity graph by performing a path-based connectivity test between embedding vectors for each of the two or more multivariate discrete time series data, predicting a label distribution for embedding vectors for each of the two or more multivariate discrete time series data using a second artificial neural network, and clustering the two or more multivariate discrete time series data based on the similarity graph and the label distribution.

The first artificial neural network may receive the two or more multivariate discrete time series data as input and generate an embedding vector of a fixed size for each of the two or more multivariate discrete time series data.

The first artificial neural network may receive the two or more multivariate discrete time series data as input and generate an embedding vector consisting of poles and coefficients of Laplace transform for each of the two or more multivariate discrete time series data.

The first artificial neural network may be trained to minimize a loss function generated based on a difference between a time function of each of the two or more multivariate discrete time series data generated by performing inverse Laplace transform using the poles and the coefficients and the two or more multivariate discrete time series data.

In the path-based connectivity test, a distance of all trajectories that exist on any path between any two embedding vectors among the embedding vectors for each of the two or more multivariate discrete time series data is measured, and 1 is outputs if the distance is within a certain range and 0 is output otherwise.

The similarity graph may be a matrix composed of connectivity test results for each of the two or more multivariate discrete time series data.

The second artificial neural network may be trained based on cross-entropy between a distribution of labels generated based on continuous time series data and distribution of labels predicted from discrete time series data.

In the clustering, clustering may be performed so that a predicted label distribution and a distance from a label for centroid of a cluster are minimized.

In the clustering, only multivariate discrete time series data that has passed a path-based connectivity test based on the similarity graph may be generated into the same cluster.

According to another aspect, there is provided an apparatus for data clustering, the apparatus including an encoder configured to receive two or more multivariate discrete time series data and generate an embedding vector for each of the multivariate discrete time series data using a first artificial neural network, a graph generator configured to generate a similarity graph by performing a path-based connectivity test between embedding vectors for each of the two or more multivariate discrete time series data, a predictor configured to predict a label distribution for embedding vectors for each of the two or more multivariate discrete time series data using a second artificial neural network, and a clustering unit configured to cluster the two or more multivariate discrete time series data based on the similarity graph and the label distribution.

According to still another aspect, there is provided a computer program, which is stored in a non-transitory computer readable storage medium and includes one or more instructions, that, when executed by a computing device including one or more processors, cause the computing device to execute receiving two or more multivariate discrete time series data as input and generating an embedding vector for each of the multivariate discrete time series data using a first artificial neural network, generating a similarity graph by performing a path-based connectivity test between embedding vectors for each of the two or more multivariate discrete time series data, predicting a label distribution for embedding vectors for each of the two or more multivariate discrete time series data using a second artificial neural network, and clustering the two or more multivariate discrete time series data based on the similarity graph and the label distribution.

DETAILED DESCRIPTION

Hereinafter, a specific embodiment of the present disclosure will be described with reference to the drawings. The following detailed description is provided to aid in a comprehensive understanding of the methods, apparatus and/or systems described herein. However, this is illustrative only, and the present disclosure is not limited thereto.

In describing the embodiments of the present disclosure, when it is determined that a detailed description of related known technologies may unnecessarily obscure the subject matter of the present disclosure, a detailed description thereof will be omitted. Additionally, terms to be described later are terms defined in consideration of functions in the present disclosure, which may vary according to the intention or custom of users or operators. Therefore, the definition should be made based on the contents throughout this specification. The terms used in the detailed description are only for describing embodiments of the present disclosure, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

Figure 1:
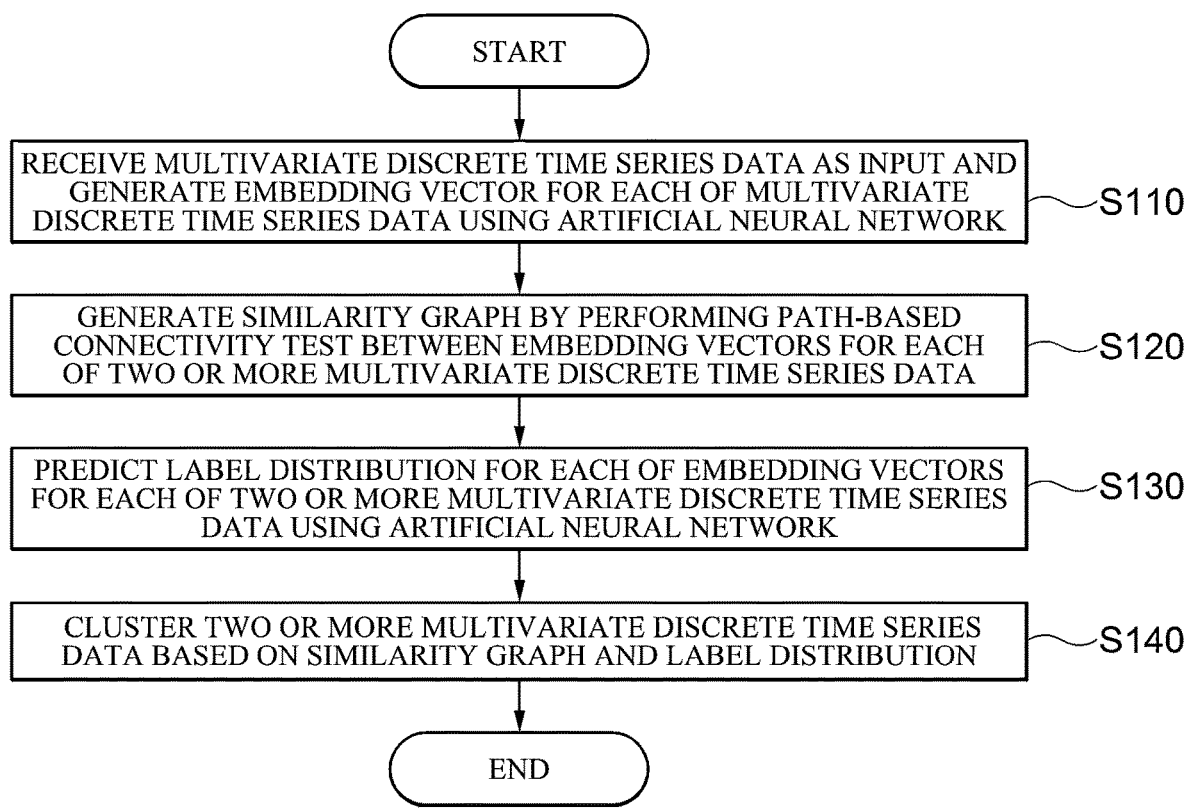
FIG. 1 is a flowchart illustrating a method for data clustering according to an embodiment.

Additionally, terms such as first, second, etc. may be used to describe various components, but the components should not be limited by the terms. Terms may be used for the purpose of distinguishing one component from another. For example, a first component may be referred to as a second component, and similarly, the second component may also be referred to as a first component without departing from the scope of the present disclosure. FIG. 1 is a flowchart illustrating a method for data clustering according to an embodiment.

According to one embodiment, the method for data clustering may be performed in a computing device including one or more processors and a memory that stores one or more programs executed by the one or more processors.

According to one example, disease progression can be manifested through a multivariate continuous time trajectory $x(t) \in \chi$ defined at $t \in [0, 1]$. Here, $\chi$ represents a functional space of all possible patient trajectories, and each trajectory can be constructed as a dim, dimensional time-variant. That is, it can be expressed as $x(t)=[x_1(t), \ldots, x_{dimx}(t)]^T$, and each can be expressed as a continuous time function $x_i$ in $L^2$ space under $L^2_{[0,1]}$, that is, the interval [0, 1]. Therefore, the trajectory space can be given as $\chi = \otimes_{dim_x} L^2_{[0,1]}$. Each trajectory x can be expressed as a target label vector $y=[y_1, \ldots, y_{dimy}]^T \in y$, and can represent a clinical status of an underlying disease. As an example, y is categorical and can be expressed as a one-hot vector, that is, $y=\{0,1\}^{dimy}$.

According to one example, p(x,y) may be a joint distribution of a continuous time trajectory and a label vector. In order to discover temporal patterns that predict the clinical status of a patient, a conditional distribution $p(x)=[p(y_1|x), \ldots, p(y_{dimy}|x)]^T$ can be defined. The conditional distribution represents a categorical distribution conditioned on x. As an example, it may be assumed that the clinical status conditioned on the patient trajectory can be expressed in one of δ-separated modes in p(x). The δ-separation modes can be separated based on an appropriate distance metric dy with some threshold δ>0. For example, the Jensen-Shannon (JS) divergence can be chosen as the distance metric.

According to one example, the temporal pattern may characterize some temporal dynamics shared by a subset of $\chi$ trajectories. For example, a general form of temporal pattern can be described based on the connectivity of the trajectory space $\chi$. Given two trajectories $x^1$, $x^2 \in \chi$, the transformation from $x^1$ to $x^2$ can be defined, a continuous path connecting two trajectories in space x is defined as $\Gamma$, and can be expressed as $\Gamma(x^1 \to x^2)$.

As an example, $\Gamma(x^1 \to x^2)$ can continuously transform a shape of $x^1$ into a shape of $x^2$. Thereafter, a set of all trajectories on the path between $x^1$ and $x^2$ is denoted by $\Phi$, and can be defined as $@ \subset X$.

According to one example, when considering multivariate continuous time trajectories, various temporal patterns may exist in $\chi$, but only a few of them may be relevant to the target label. On the other hand, the clinical status indicated by the same target label may appear in a trajectory of the patient through different temporal characteristics. For example, in a lung transplant referral for the patient with cystic fibrosis, (i) low lung function score, (ii) rapid decline in lung function score, and (iii) multiple exacerbations requiring intravenous antibiotics can be identified with distinct predictive temporal patterns.

In order to provide insight into disease progression, phenotypes should be defined based on distinct predictive temporal patterns. Based on this phenotypic concept, a new path-based similarity score that measures the change in the conditional label distribution p(x) depending according to the transformation between two trajectories can be considered. As an example, when considering two consecutive time trajectories $x^1$, $x^2$ and the path $\Gamma(x^1 \to x^2)$, in a score function, the similarity between $x^1$ and $x^2$ can be evaluated based on the effect on a label y through the path $\Gamma$, as expressed in Equation 1 below.

$$d_\Gamma(x^1, x^2) = \max_{\substack{x \in \Gamma(x^1 \to x^2) \\ i \in \{1,2\}}} d_y(p(x), p(x^i)) \quad \text{[Equation 1]}$$

Here, small values of $d_\Gamma(x^1, x^2)$ represent trajectories $x^1$ and $x^2$ that share a similar clinical status y, and contain similar temporal patterns that predict an associated label.

According to one example, the phenotypes can be defined as a predictive temporal pattern associated with a distinct clinical status.

Definition 1. Assume that (phenotypes) v is a centroid of the δ separable mode in p(x). Afterwards, a unique phenotype expressed as a tuple (v, $\Phi$) which has $\Phi$ as a set of trajectories that satisfy two properties, can be represented, as expressed in Equation 2 below.

$$\text{(Similar clinical status)} \max_{x \in \Phi} d_y(p(x), v) \leq \frac{\delta}{2} \quad \text{[Equation 2]}$$

$$\text{(Similar predictive pattern)} \max_{\substack{x^1, x^2 \in \Phi \\ \Gamma \subseteq \Phi}} d_\Gamma(x^1, x^2) \leq \delta$$

Here, any trajectory $x \in \chi/\Phi$ is not connected to $\Phi$ or may have a different mode. The homogeneity of each phenotype (v, $\Phi$) indicates that continuous time trajectories exhibiting similar temporal patterns lead to similar clinical statuses, which can ensure that they provide prognostic value for the underlying disease progression.

As an example, the continuous time trajectory of a real patient may be collected by individual observations performed at irregular time intervals. That is, data collected from the patient may consist of discrete time series data rather than continuous time series data. Accordingly, a process for constructing the phenotype from discontinuously collected data is necessary.

According to one embodiment, the apparatus for data clustering may receive two or more multivariate discrete time series data as input and generate an embedding vector for each of the multivariate discrete time series data using a first artificial neural network (110).

Figure 2:
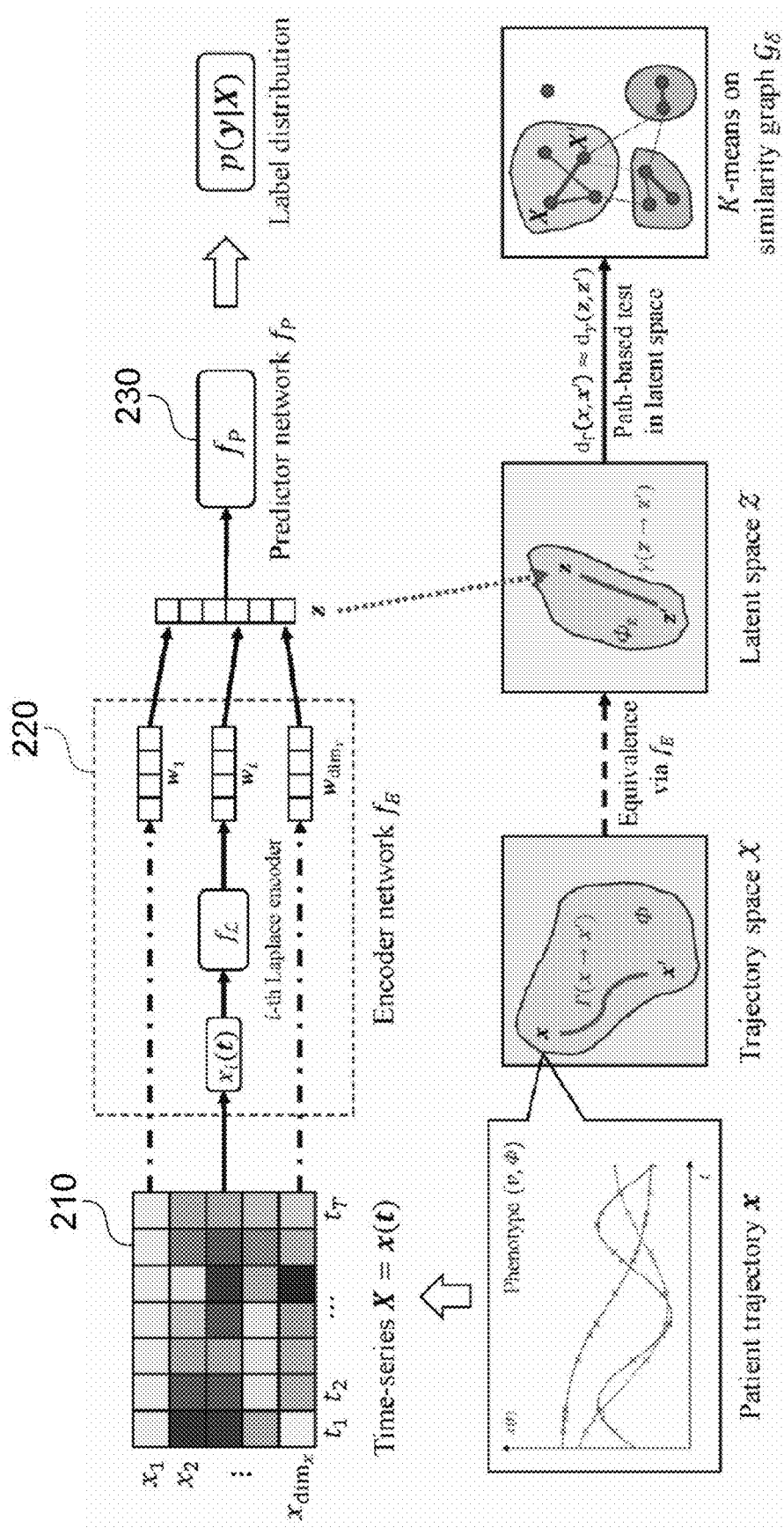
FIG. 2 is an exemplary diagram for describing a configuration of a video expression learning device according to an embodiment.

As an example, information collected from the patient may be one or more measurement values for one or more types. That is, input data may be multivariate discrete time series data. Referring to FIG. 2, the input data is multivariate data expressed as $x^1$ to $x_{dimx}$, and may be discrete time series data measured from $t_1$ to $t_T$. However, this is an assumption for convenience of description, and the time, length, or number of times measured for each data may be different.

According to one example, a data set containing discrete observation values for continuous time trajectories and target labels can be expressed as $D=\{(t^i, x^i, y^i)\}_{i=1}^N$. The discrete observations can be represented as a time series $X=[x(t_1), x(t_2), \ldots, x(t_T)]$, observation timestamps may be $t=[t1, t2, \ldots, tT]T$, where $0 \le t_1 \le \ldots \le t_T \le 1$. The label vector $y \in Y$ represents the clinical status sampled from the conditional distribution $p(y|x)$.

According to one embodiment, the first artificial neural network may receive two or more multivariate discrete time series data as input and generate an embedding vector having a fixed size for each of the two or more multivariate discrete time series data. For example, even when the sizes of multivariate discrete time series data input to the first artificial neural network are different, the first artificial neural network can generate an embedding vector having a predetermined fixed length regardless of the size of the input data. As an example, the first artificial neural network may be an artificial neural network that receives time series data as input and generates an embedding vector, such as a recurrent neural network (RNN) or a temporal convolutional network (TCN).

According to one embodiment, the first artificial neural network may receive two or more multivariate discrete time series data as input and generate an embedding vector composed of poles and coefficients of the Laplace transform for each of the two or more multivariate discrete time series data.

Referring to FIG. 2, multivariate discrete time series data 210 is input to an encoder network 220 including the first artificial neural network, and an embedding vector z composed of poles and coefficients can be output using the Laplace transform. For example, by utilizing the dimx feature-specific Laplace encoder as an encoder fE, the discrete observation values of a continuous time trajectory $x \in X$ can be transformed into a fixed-length embedding $z \in Z$ in a latent space. That is, it can be expressed as $z \triangleq [f_L(x_1(t)), \ldots, f_L(x_{dim_x}(t))]^T$.

According to one example, the first artificial neural network may encode each dimension of the discrete time series data into a parametric function integrated in a frequency domain as an approximation using the Laplace transform. As an example, $x(t)=[x(t_1), \ldots, x(t_T)]^T \in R$ can be assumed to be discrete time series data for a univariate trajectory $x(t)$ at a timestamp $t=[t_1, \ldots, t_T]^T$ of unit interval. In this case, the first artificial neural network may be a Laplace encoder, and the Laplace encoder $f_L:R^T \to C^{n(d+1)}$ can encode the discrete time series data $x(t)$ as a rational function in a complex plane with a maximum order of $d \in N$ and $n \in N$ poles, as expressed in Equation 3 below.

$$F_w(s) = \sum_{m=1}^{n} \sum_{l=1}^{d} \frac{c_{m,l}}{(s-p_m)^l}, \quad c_{m,l}, p_m \in C \quad \text{[Equation 3]}$$

Here, $w \triangleq f_L(x(t))=[p_1, \ldots, p_n, c_{1,1}, \ldots, c_{n,d}]^T$ is the Laplace embedding generated through the first artificial neural network and, $c_{m,1}$ and $p_m$ represent coefficients and poles, respectively.

According to one embodiment, the first artificial neural network can be trained to minimize a loss function generated based on the difference between a time function of each of the two or more multivariate discrete time series data generated by performing inverse Laplace transform using poles and coefficients and the two or more multivariate discrete time series data.

According to one example, when performing inverse Laplace transform from the Laplace embedding generated through the first artificial neural network, a continuous time function can be acquired. In this case, the inverse Laplace transform can be expressed as Equation 4 below.

$$\hat{x}(t) = \frac{1}{2\pi j} \lim_{T \to \infty} \int_{\sigma-jT}^{\sigma+jT} e^{st} F_w(s) ds \quad \text{[Equation 4]}$$

Here, $j_2 = -1$, and $\sigma$ is a predetermined complex number.

According to one example, the loss function of the first artificial neural network can be expressed as the equation below.

$$\mathcal{L}_{laplace}(\theta_L) = \mathcal{L}_{mse}(\theta_L) + \alpha \mathcal{L}_{unique}(\theta_L) \quad \text{[Equation 5]}$$

Here, $\sigma$ is a balance coefficient, and $L_{mse}$ and $L_{unique}$ are loss functions that represent a Laplace embedding reconstruction error and uniqueness of the Laplace embedding, respectively.

As an example, the first artificial neural network can obtain the loss function of the Laplace embedding reconstruction error using the difference between input time series data $x(t)=[x(t_1), \ldots, x(t_T)]$ and a value calculated by applying $t=[t_1, \ldots, t_T]$ to the continuous time function $\hat{x}(t)$ obtained by inverse transformation. For example, the loss function of the Laplace embedding reconstruction error can be expressed as Equation 6 below.

$$\mathcal{L}_{mse}(\theta_L) = \frac{1}{T} \sum_{i=1}^{T} \|x(t_i) - \hat{x}(t_i)\|_2^2 \quad \text{[Equation 6]}$$

According to one embodiment, the first artificial neural network may be trained further using the loss function for the predicted Laplace transform coefficient and uniqueness of the poles. Here, the uniqueness refers to the properties that the acquired poles are unique, the reconstructed trajectory is a real value, and two unique embeddings generate the same trajectory.

According to one embodiment, the Laplace transform poles may be aligned in lexical order. As an example, $F_w(s)$ may be a permutational equivariant for the poles of w. Accordingly, it is possible to impose lexical order ($p_m \leq p_{m+1}$ for $m=1, \ldots, n-1$) on the poles in order to obtain a unique Laplace embedding w. To this end, the encoder network 220 can transform the unaligned embedding into the final unique embedding w by aligning the poles (along with their associated coefficients) in lexical order.

According to one embodiment, the loss function representing the uniqueness of the Laplace embedding may include a loss function generated so as to give a penalty when the difference between two different Laplace transform poles adjacent to each other according to lexical order is less than a predetermined threshold.

For example, in order to achieve a stable ordering that is robust to noise in the embedding w, it is necessary to ensure that pairs of poles are generated sufficiently differently. Therefore, given two poles $p_m$, and $p_1$ that are adjacent in order, $(Re(p_m) < Re(p_1))^{\wedge}(|Re(p_m) - Re(p_1)| > \delta_{pole})$ or $(|Re(p_m) - Re(p_1)| \leq \delta_{pole})^{\wedge}(Im(p_m) \leq Im(p_1))$ can be established. Here, $p_m > p_1$, and $\delta_{pole} \geq 0$ is a threshold that controls the robustness of lexical order and is a hyperparameter.

According to one example, the first artificial neural network may be trained using a loss function that gives a penalty when the two poles of the embedding w are almost the same. That is, when $|p_m - p_1| \leq \delta_{pole}$, $p_m$ and $p_1$ can be considered the same pole. As an example, the loss function can be expressed using hinge loss as expressed in Equation 7 below.

$$l_{sep}(\hat{x}(t)) = \sum_{m \neq l} \max(0, \delta_{pole} - |p_m - p_l|) \quad \text{[Equation 7]}$$

Here, $p_m$ and $p_1$ are the two poles of the embedding w for the input time series $x(t)$, and $\delta_{pole} > 0$ is a threshold for pole alignment.

According to one embodiment, the loss function representing the uniqueness of the Laplace embedding may include a loss function generated so as to give a penalty to an imaginary part of the time function generated by performing inverse Laplace transform. For example, the first artificial neural network can suppress the imaginary part of the reconstructed function $x(t)$ as expressed in Equation 8 below so that $x(t)$ has a real value in [0, 1].

$$l_{real}(\hat{x}(t)) = \frac{1}{T}\|Im(\hat{x}(t))\|_2^2 \quad \text{[Equation 8]}$$

Here, $t = [t_1, \ldots, t_T]^T$ contains randomly sampled timestamps over $t_j \in [0,1]$ for $j=1, \ldots, T$.

According to one embodiment, the loss function representing the uniqueness of the Laplace embedding may include a loss function generated so as to give a penalty when the time functions generated by performing inverse Laplace on two different embeddings are similar. For example, the first artificial neural network may be trained so that two different embeddings do not generate the same time function. The loss function for this can be expressed as Equation 9 below.

$$l_{distinct}(\hat{x}^i(t), \hat{x}^j(t)) = \|w^i - w^j\|_2^2 e^{-\|\hat{x}^i(t) - \hat{x}^j(t)\|_2^2} \quad \text{[Equation 9]}$$

Here, $$e^{-\|\hat{x}^i(t) - \hat{x}^j(t)\|_2^2}$$

is used to find the similar time function, $w^i$ and $w^j$ are embeddings of the input time series, and $\hat{x}^i(t)$ and $\hat{x}^j(t)$ are the reconstructed time functions. According to one embodiment, the loss function representing the uniqueness of Laplace embedding may include the loss functions of Equations 7 to 9 above, and can be expressed as follows.

$$\mathcal{L}_{unique}(\theta_L) = \sum_{d=1}^{dim_x}\left(\frac{1}{N}\sum_i l_{sep}(\hat{x}_d^i(t)) + \frac{\alpha_1}{\alpha} l_{real}(\hat{x}_d^i(t)) + \frac{\alpha_2}{\alpha}\frac{1}{N(N-1)}\sum_{i \neq j} l_{distinct}(\hat{x}_d^i(t), \hat{x}_d^j(t))\right) \quad \text{[Equation 10]}$$

Here, $\alpha$ is any coefficient, and $\alpha_1$ and $\alpha_2$ are balance coefficients that compromise different uniqueness properties in the first artificial neural network.

Like this, the first artificial neural network can be trained using the loss function such as Equation 5 based on Equations 6 and 10.

According to one embodiment, the sizes of the Laplace transform coefficient and poles may each be limited to less than a predetermined value. For example, each pole $p_m$ of the embedding w may be located in a complex plane C. In this case, a real part $Re(p_m)$ represents the increase or decrease rate of a corresponding component $e^{Re(p_m)t}$ in the time domain. Accordingly, if $Re(p_m)$ is too large or too small, an unrealistic signal may be generated. Additionally, an imaginary part $Im(p_m)$ represents a vibration frequency of the corresponding component $((\cos(Im(p_m)t)+j\sin(Im(p_m)t),$ $j^2=-1))$. Therefore, very high frequency vibrations are generally caused by noise and thus should be discarded. Accordingly, as an example, a range of the pole can be limited to $\{p|Re(p)| \leq r_{max}, |Im(p)| \leq freq_{max}\}$, where $r_{max}$ limits the maximum rate of increase or decrease in the reconstruction time function, and high frequency signals above $freq_{max}$ can be considered noise components in the time series $x(t)$ and can be discarded when constructing $F_w(s)$. Furthermore, as an example, the coefficient $c_{m,1}$ of the embedding w is limited to $\{c/Re(c)| \leq c_{max}, |Im(c)| \leq c_{max}\}$.

The $L_{unique}$ implies three aspects of (i) acquired poles are unique, (ii) the reconstructed trajectories are real values, and (iii) two unique Laplace embeddings does not produce the same trajectory.

According to one embodiment, the apparatus for data clustering may generate a similarity graph by performing a path-based connectivity test between embedding vectors for each of two or more multivariate discrete time series data (120).

According to one example, the phenotypic property in Definition 1 indicates that all trajectories of that phenotype should share a similar prediction pattern. Accordingly, two time series $X_1$ and $X_2$ with continuous time trajectories $x^1$ and $x^2$ in the same phenotype $(v, \Phi)$ may be considered. In other words, there should exist a transformation $\Gamma$ from trajectory $x^1$ to $x^2$ where the condition $d\Gamma(x^1, x^2) \leq \delta$ can be maintained. On the other hand, violating the above conditions suggests that they come from different phenotypes, and implies that there are significant differences between the two trajectories. Therefore, a path-based connectivity test, i.e., $\exists \Gamma(x^1 \to x^2)$, $d\Gamma(x^1, x^2) \leq \delta$, can be utilized to evaluate the similarity phenotype between two given trajectories $x^1$ and $x^2$. As an example, a distance matrix S can be generated by evaluating the path-based connectivity for all possible time series pairs in data set D. Element-wise comparison of S and the threshold $\delta$ can yield a similarity graph $G_\delta$ with edges between similar samples.

According to one example, in order to discover the phenotype in the data set D, it may be assumed that there is a suitable approximation $f(X)$ of the conditional label distribution $p(x)$ from individual observations of X. Therefore, the similarity graph $G_\delta$ may be constructed based on the path-based connectivity test with $f(X)$.

According to one embodiment, in the path-based connectivity test, a distance of all trajectories that exist on any path between any two embedding vectors among the embedding vectors for each of the two or more multivariate discrete time series data is measured, 1 is outputs if the distance is within a certain range, and 0 is output otherwise. For example, as shown in Equation 2, if all trajectories included in the set $\Phi$ of trajectories that exist on the other path between two embedding vectors are located within a predetermined distance $\delta$, the path-based connectivity test can be considered to have been passed. In this case, Similar predictive pattern in Equation 2 can be expressed as follows.

$$\max_{\substack{x^1, x^2 \in \Phi_z \\ \Gamma \subseteq \Phi_z}} d_\Gamma(z^1, z^2) \leq \delta \quad \text{[Equation 11]}$$

Figures 3, 4:
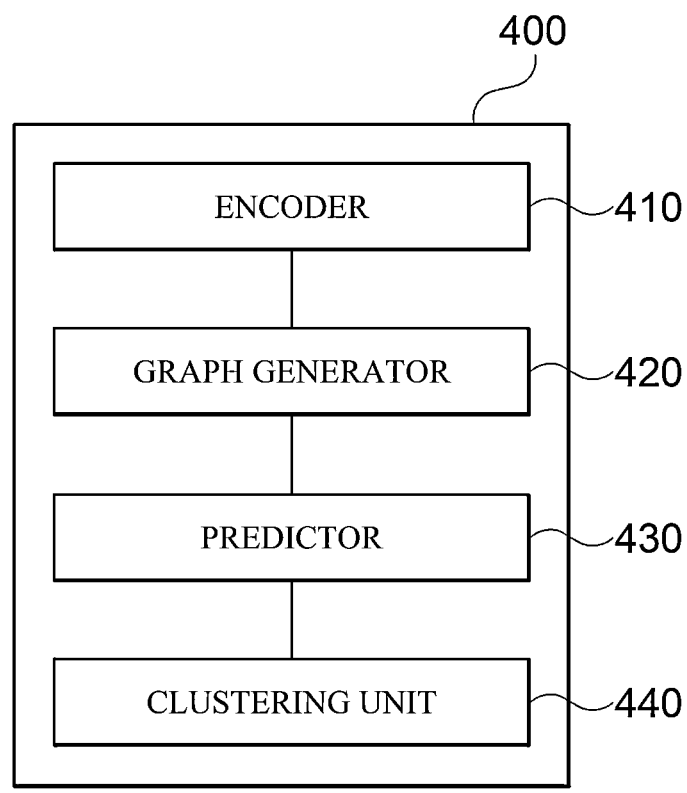
FIG. 3 is an exemplary diagram for describing a similarity graph according to an example.
FIG. 4 is a configuration diagram of an apparatus for data clustering according to an embodiment.

According to one embodiment, the similarity graph may be a matrix composed of connectivity test results for each of the two or more multivariate discrete time series data. For example, FIG. 3 shows a similarity graph when $x^1$-$x^2$ and $x^2$-$x^3$ among $x^1$, $x^2$, and $x^3$ pass the connectivity test, and $x^1$-$x^3$ does not pass the connectivity test.

According to one embodiment, the apparatus for data clustering may predict the label distribution for embedding vectors for each of the two or more multivariate discrete time series data using a second artificial neural network (130).

In order to estimate the conditional label distribution from the discrete time series data, two networks composed of an encoder, which is the first artificial neural network, and a predictor, which is the second artificial neural network, may be used. As an example, the predictor $f_P$ can estimate the conditional label distribution by receiving the embedding z as input generated by a predetermined encoder that receives time series data as input and generates an embedding vector of a fixed size. In this case, the encoder may be a Laplace encoder.

According to one embodiment, the second artificial neural network may be trained based on the cross-entropy between the distribution of labels generated based on the continuous time series data and the distribution of labels predicted from the discrete time series data.

For example, in order to estimate the conditional distribution $p(x)$, $f(X) = f_P \cdot f_E(X) \approx p(x)$ can be obtained using the first artificial neural network $f_E$, which is composed of an encoder that generates an embedding of a fixed length from time series data, and the second artificial neural network $f_P$. Here, X represents the discrete observation values of the trajectory x.

According to one example, the second artificial neural network $f_P$ can be trained based on cross-entropy loss as expressed in Equation 12 below.

$$\mathcal{L}_{predictor}(\theta_p) = -\sum_{i=1}^{N} \sum_{c=1}^{dim_y} y_c^i \log f_p(z^i)_c \quad \text{[Equation 12]}$$

Here, $z = f_E(X)$ and the subscript c denotes a c-th element in an output space. Additionally, in order to maintain the property of the Laplace encoder, the second artificial neural network can be updated only through the signal of the label during training.

According to one embodiment, the apparatus for data clustering may cluster the two or more multivariate discrete time series data based on the similarity graph and the label distribution (140). As an example, in the clustering, clustering may be performed so that the predicted label distribution and the distance from the centroid label of the cluster are minimized. In this case, based on the similarity graph, only the multivariate discrete time series data that has passed the path-based connectivity test can be generated into the same cluster. For example, data clustering can be performed through limited optimization as expressed in Equation 13 below.

$$\min_C \sum_{C_k \in C} \sum_{X \in C_k} d_y(f(X), v_k), \text{ s.t. } \forall X^1, X^2 \in C_k, X^1 \overset{g\delta}{\leftrightarrow} X^2 \quad \text{[Equation 13]}$$

Where $C = \{C_1, C_2, \ldots, C_K\}$ is a feasible set of $K \in N$ clusters, each having center $v_k$ with average density $f(X)$. The threshold $\delta$ is generally not known in advance, and thus for consistency with Definition 1, the value thereof can be set according to $\delta = 2 \max_{C_k \in C}, X \in C_k d_y(f(X), v_k)$. Here $X^1 \overset{g\delta}{\leftrightarrow} X^2$ means that there is a path to the graph $G_\delta$ where $X^1$ and $X^2$ are connected to each other. In Equation 13, the objective function ensures that the centroids of cluster are clearly distinct in the approximate label distribution $f(X)$, while the constraints on the similarity graph $G_\delta$ ensure that samples from the same cluster have similar phenotypes. Each cluster $C_k$ represents a unique phenotype with the centroid $v_k$ describing the associated clinical condition, and the predicted temporal pattern can be explained in terms of the collection of time series of $C_k$.

FIG. 4 is a configuration diagram of an apparatus for data clustering according to an embodiment.

According to one embodiment, an apparatus for data clustering 400 may include an encoder 410 that receives two or more multivariate discrete time series data and generates the embedding vector for each of the multivariate discrete time series data using the first artificial neural network, a graph generator 420 that generates the similarity graph by performing the path-based connectivity test between embedding vectors for each of two or more multivariate discrete time series data, a predictor 430 that predicts the label distribution for embedding vectors for each of the two or more multivariate discrete time series data using the second artificial neural network, and a clustering unit 440 that clusters the two or more multivariate discrete time series data based on the similarity graph and label distribution.

In the embodiment of FIG. 4, descriptions that overlap with those described with reference to FIGS. 1 to 3 have been omitted.

Figure 5:
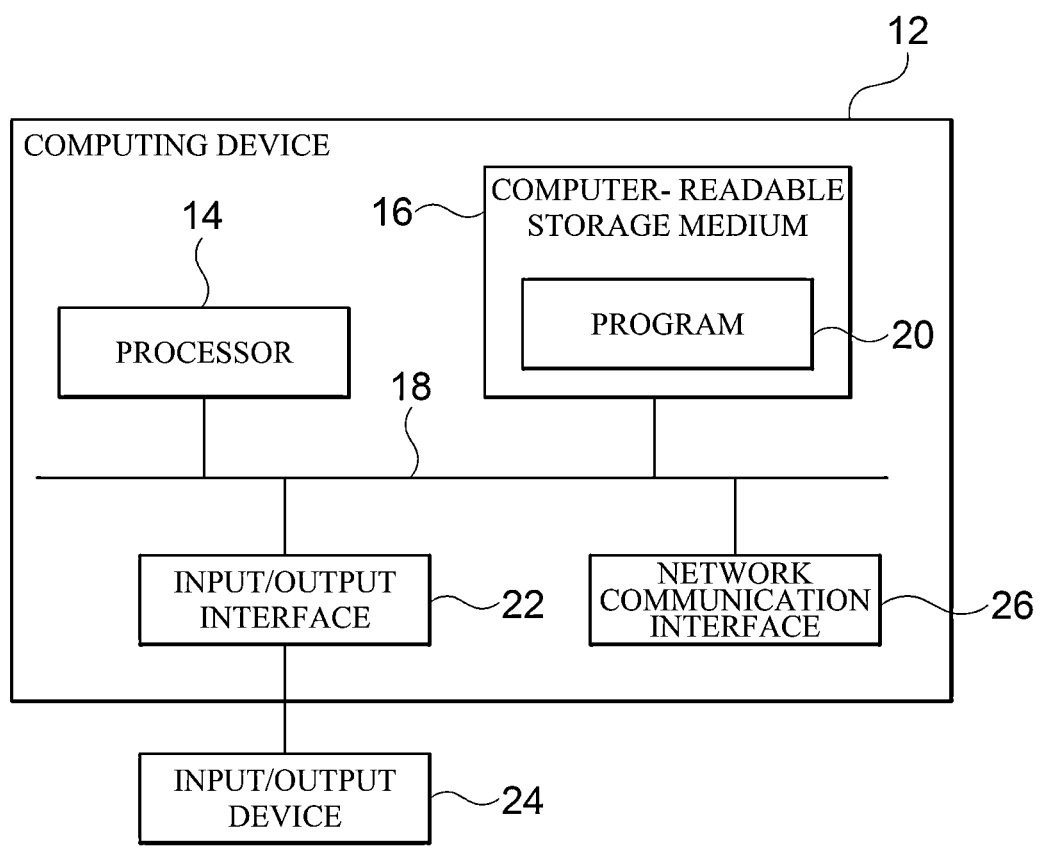
FIG. 5 is a block diagram for illustratively describing a computing environment 10 including a computing device suitable for use in exemplary embodiments.

FIG. 5 is a block diagram for illustratively describing a computing environment 10 including a computing device suitable for use in exemplary embodiments. In the illustrated embodiment, respective components may have different functions and capabilities other than those described below, and may include additional components in addition to those described below.

The illustrated computing environment 10 includes a computing device 12. In one embodiment, the computing device 12 may be the apparatus for data clustering.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured so that the computing device 12 performs operations according to the exemplary embodiment.

The computer-readable storage medium 16 is configured so that the computer-executable instruction or program code, program data, and/or other suitable forms of information are stored. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a speech or sound input device, input devices such as various types of sensor devices and/or photographing devices, and/or output devices such as a display device, a printer, a speaker, and/or a network card. The exemplary input/output device 24 may be included inside the computing device 12 as a component configuring the computing device 12, or may be connected to the computing device 12 as a separate device distinct from the computing device 12.

Data clustering of discrete time series data may be performed. Furthermore, a method of predicting characteristics of a continuous time function from discontinuous time series data through Laplace encoding may be provided.

Although representative embodiments of the present disclosure have been described in detail, a person skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents to the claims.

What is claimed is:

1. A method for data clustering performed in a computing device including one or more processors and a memory that stores one or more programs executed by the one or more processors, the method comprising:
   receiving two or more multivariate discrete time series data as input and generating an embedding vector for each of the multivariate discrete time series data using a first artificial neural network;
   generating a similarity graph by performing a path-based connectivity test between embedding vectors for each of the two or more multivariate discrete time series data;
   predicting a label distribution for embedding vectors for each of the two or more multivariate discrete time series data using a second artificial neural network; and
   clustering the two or more multivariate discrete time series data based on the similarity graph and the label distribution,
   wherein the first artificial neural network generates an embedding vector consisting of poles and coefficients of Laplace transform for each of the two or more multivariate discrete time series data, and
   the first artificial neural network is trained to minimize a loss function generated based on a difference between a time function of each of the two or more multivariate discrete time series data generated by performing inverse Laplace transform using the poles and the coefficients and the two or more multivariate discrete time series data.

2. The method of claim 1, wherein the first artificial neural network receives the two or more multivariate discrete time series data as input and generates an embedding vector of a fixed size for each of the two or more multivariate discrete time series data.

3. The method of claim 1, wherein the first artificial neural network is further trained using a second loss function for uniqueness of Laplace embedding, and
   the second loss function includes a loss function in which the Laplace transform poles are arranged in a lexical order and which is generated so as to give a penalty when a difference between two different Laplace transform poles adjacent to each other is less than a predetermined threshold.

4. The method of claim 3, wherein the second loss function further includes a loss function generated so as to give a penalty to an imaginary part of a time function generated by performing inverse Laplace transform.

5. The method of claim 4, wherein the second loss function further includes a loss function generated so as to give a penalty when time functions generated by performing inverse Laplace transform on two different embeddings are similar.

6. The method of claim 1, wherein, in the path-based connectivity test, a distance of all trajectories that exist on any path between any two embedding vectors among the embedding vectors for each of the two or more multivariate discrete time series data is measured, and
   1 is outputs if the distance is within a certain range, and 0 is output otherwise.

7. The method of claim 6, wherein the similarity graph is a matrix composed of connectivity test results for each of the two or more multivariate discrete time series data.

8. The method of claim 1, wherein the second artificial neural network is trained based on cross-entropy between a distribution of labels generated based on continuous time series data and distribution of labels predicted from discrete time series data.

9. The method of claim 1, wherein, in the clustering, clustering is performed so that a predicted label distribution and a distance from a label for centroid of a cluster are minimized.

10. The method of claim 9, wherein, in the clustering, only multivariate discrete time series data that has passed a path-based connectivity test based on the similarity graph are generated into the same cluster.

11. An apparatus for data clustering, comprising:
an encoder configured to receive two or more multivariate discrete time series data and generate an embedding vector for each of the multivariate discrete time series data using a first artificial neural network;
a graph generator configured to generate a similarity graph by performing a path-based connectivity test between embedding vectors for each of the two or more multivariate discrete time series data;
a predictor configured to predict a label distribution for embedding vectors for each of the two or more multivariate discrete time series data using a second artificial neural network; and
a clustering unit configured to cluster the two or more multivariate discrete time series data based on the similarity graph and the label distribution,
wherein the first artificial neural network is configured to generate an embedding vector consisting of poles and coefficients of Laplace transform for each of the two or more multivariate discrete time series data, and
the first artificial neural network is configured to be trained to minimize a loss function generated based on a difference between a time function of each of the two or more multivariate discrete time series data generated by performing inverse Laplace transform using the poles and the coefficients and the two or more multivariate discrete time series data.

12. A non-transitory computer readable storage medium storing a computer program including one or more instructions, that, when executed by a computing device including one or more processors, cause the computing device to execute:
receiving two or more multivariate discrete time series data as input and generating an embedding vector for each of the multivariate discrete time series data using a first artificial neural network;
generating a similarity graph by performing a path-based connectivity test between embedding vectors for each of the two or more multivariate discrete time series data;
predicting a label distribution for embedding vectors for each of the two or more multivariate discrete time series data using a second artificial neural network; and
clustering the two or more multivariate discrete time series data based on the similarity graph and the label distribution,
wherein the first artificial neural network generates an embedding vector consisting of poles and coefficients of Laplace transform for each of the two or more multivariate discrete time series data, and
the first artificial neural network is trained to minimize a loss function generated based on a difference between a time function of each of the two or more multivariate discrete time series data generated by performing inverse Laplace transform using the poles and the coefficients and the two or more multivariate discrete time series data.

* * * * *